3,401,218
METHOD OF PRODUCING GASTROINTESTINAL SPASMOLYTIC ACTIVITY WITH POLYOXYPROPYLENE-POLYOXYETHYLENE POLYMERS
Allen Misher, Philadelphia, Pa., assignor to Smith Kline & French Laboratories, Philadelphia, Pa., a corporation of Pennsylvania
No Drawing. Continuation-in-part of application Ser. No. 516,104, Dec. 23, 1965. This application June 9, 1967, Ser. No. 644,786
5 Claims. (Cl. 424—78)

ABSTRACT OF THE DISCLOSURE

Pharmaceutical compositions having gastrointestinal spasmoyltic activity containing a polyoxypropylene-polyoxyethylene polymer in which the average molecular weight of the polyoxypropylene units is from about 950 to about 2750 and the polyoxyethylene groups are present from about 5% to about 70% of the molecule and a method of producing gastrointestinal spasmolytic activity.

---

This application is a continuation-in-part of copending Ser. No. 516,104 filed Dec. 23, 1965, now abandoned.

This invention relates to pharmaceutical compositions having spasmolytic activity and to a method of producing gastrointestinal spasmolytic activity using said compositions. More specifically, this invention relates to a method of producing spasmolytic activity without the concomitant limiting or anticholinergic side effects common to the prior art spasmolytic compositions.

Prior to the present invention, there has been a great need for compounds and compositions which produce spasmolytic activity without the usual anticholinergic side effects, such as, for example dry mouth and mydriasis which are common to known anticholinergic-antispasmodic compounds. The need of a safe and effective composition devoid of the above noted side effects and having spasmolytic activity has been great.

The novel pharmaceutical compositions and methods of this invention are unique in that they promptly and consistently depress or completely eliminate abnormal gastric motility. These compositions are useful in the treatment of spasticity or hypermotility of the gastrointestinal tract. Further, the compositions of this invention are very poorly absorbed from the gastrointestinal tract and are therefore free of systemic side effects. Such biological activity has never been reported for compounds of the chemical class described hereinafter.

Most advantageously, the compositions of this invention are in dosage unit form and comprise a nontoxic pharmaceutical carrier and a nonionic polyoxyalkylene polymer. More specifically, the compositions of this invention comprise a polyoxypropylene-polyoxyethylene block polymer which has the following structural formula:

FORMULA 1

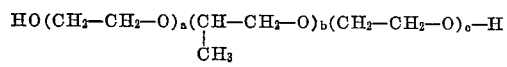

wherein $b$ has a molecular weight of at least 900 and $a$ and $c$ are present from about 5% to 70% of the total molecule.

The amount of antimotility or musculotropic activity of the above noted novel spasmolytic compounds varies according to the molecular weight of the polyoxypropylene hydrophobic nucleus and the percent of the hydrophilic ethylene oxide units present in the molecule. Preferably the above compounds of Formula 1 are those having the polyoxypropylene polymers present with an average molecular weight of at least 900 and the oxyethylene groups are present from about 5% to about 70% by weight of the mixture as mentioned hereabove.

Particularly active polymer ingredients are those represented by Formula 1 when the polyoxypropylene polymers have a molecular weight of from about 950 to about 2750 and the polyoxyethylene units are present from about 10% to about 40% by weight of the total mixture.

Most advantageously, the compositions of this invention comprise an oral dosage unit containing a polyoxypropylene-polyoxyethylene polymer of Formula 1 wherein the polyoxypropylene hydrophobic units have a molecular weight of from about 2050 to about 2250 and the polyoxyethylene hydrophilic units are present from about 30% to about 40% of the total molecule which compounds are the most active of the series.

The polyoxypropylene-polyoxyethylene polymers as illustrated in Formula 1 and present in these novel compositions are prepared by condensing propylene oxide with an organic compound containing a plurality of reactive hydrogen atoms to prepare a polyoxypropylene polymer having a molecular weight of at least 900. The ethylene oxide hydrophilic group is then introduced into the molecule by condensing the ethylene oxide or its equivalent with the polyoxypropylene polymer. The detailed method of preparation of the polyoxypropylene-polyoxyethylene polymers used in the compositions of this invention is set forth in United States Patent No. 2,674,619.

The polyoxypropylene-polyoxyethylene polymers of Formula 1 will be present in an amount to produce gastrointestinal spasmolytic activity. Preferably, the composition will contain the polymer ingredient in an amount of from about 50 mg. to about 1000 mg., advantageously from about 250 mg. to about 500 mg. per dosage unit.

In their most advantageous forms the compositions in accordance with this invention will also contain a nontoxic pharmaceutical carrier in addition to the medicinal agent. The pharmaceutical carrier may be, for example, either a solid or liquid. Exemplary of solid carriers are lactose, terra alba, sucrose, talc, gelatin, agar, pectin, acacine, magnesium stearate, stearic acid and the like. Exemplary of liquid carriers are syrup, peanut oil, olive oil, alcohol, water and the like. Similarly, the carrier or diluent may include any time delay material well known to the art, such as, glyceryl monostearate or glyceryl distearate alone or with a wax.

A wide variety of pharmaceutical forms can be employed. Thus, if a solid carrier is used the preparation can be tableted placed in a hard gelatin capsule or made in the form of a troche or lozenge. The amount of solid carrier will vary widely but preferably will be from about 25 mg. to about 1 gm. If a liquid carrier is employed, the preparation will be in the form of a soft gelatin capsule, emulsion, syrup or liquid suspension.

The method in accordance with this invention comprises administering internally, preferably orally, to animals in an amount sufficient to product gastrointestinal spasmolytic activity a compound as represented by the above Formula 1 combined with a pharmaceutical carrier. For example, doses of from 16 mg./kg. to 128 mg./kg. administered internally to squirrel monkeys and 50 mg./kg. to 200 mg./kg. administered internally to rats produces gastrointestinal spasmolytic activity.

The polyoxypropylene-polyoxyethylene polymer active ingredient preferably will be, per unit dose, in an amount of from about 50 mg. to about 1000 mg. and advantageously from about 250 mg. to about 500 mg. The administration of the unit doses is preferably orally to animals suffering from gastric hypermotility or other similar gastrointestinal abnormalties. Advantageously, equal doses will be administered one to four times daily. Preferably the daily dosage will be from 50 mg. to about 4.0 gms. and most advantageously from 250 mg. to about 1.0 gm. of active ingredient.

When the method of administration described above is carired out, spasmolytic activity is achieved without the concomitant mydriatic and antisalivary side effects common to known antispasmodic medicaments.

The following examples are not limiting but are illustrative of compounds of this invention and the procedures for their preparation. Other variations of this invention will be obvious to those skilled in this art.

Example 1

To 60 gms. of propylene glycol in a sealed reaction vessel is added 8.0 gms. of anhydrous sodium hydroxide. The mixture is treated with nitrogen to remove the air and heated with stirring until the sodium hydroxide is dissolved. Propylene oxide is then fed into the mixture as fast as it could react until the product obtains an average molecular weight of 2050 as determined by hydroxyl number. The product is cooled under nitrogen and the sodium hydroxide neutralized with sulfuric acid. The mixture is filtered and the final product is a water insoluble polyoxypropylene glycol having an average molecular weight of 2050.

To 500 gms. of the polyoxypropylene glycol made as described above is added 5 gms. of anhydrous sodium hydroxide. To this mixture which has been heated to 120° C. is added 105 gms. of ethylene oxide. The amount of ethylene oxide added is equal to approximately 33% of the total molecule, i.e., the total weight of the polyoxypropylene glycol plus the weight of the added ethylene oxide.

The mixture is cooled and filtered and the final product is a colorless oily liquid polyoxypropylene-polyoxyethylene polymer wherein the polyoxypropylene hydrophobic unit has an average molecular weight of 2050 and the polyoxyethylene hydrophilic unit is present in an amount of 33% of the total molecule.

Example 2

Ingredients: Mg./capsule, mg.
Polyoxypropylene-polyoxyethylene polymer of
 Example 1 _____ 1000
Ethanol, U.S.P. _____ 100

Disperse the ethanol in the polymer and place in a soft gelatin capsule.

One capsule is administered orally four times a day.

Example 3

Ingredients: Mg./capsule, mg.
Polyoxypropylene-polyoxyethylene polymer of
 Example 1 _____ 500
Peanut oil _____ 100

Disperse the peanut oil in the polymer and place in a soft gelatin capsule.

One capsule is administered orally once a day.

Example 4

Ingredients: Mg./tablet, mg.
Polyoxypropylene (M.W. 2050), polyoxyethylene (70%) solid polymer _____ 50
Calcium sulfate dihydrate _____ 100
Sucrose _____ 25
Starch _____ 15
Talc _____ 5
Stearic acid _____ 3

The sucrose, calcium sulfate and polyoxypropylene-polyoxyethylene are thoroughly mixed and granulated with hot 10% gelatin solution. The wetted mass is passed through a #16 U.S. Standard mesh screen directly onto drying trays. The granules are dried at 120° F. and passed through a #20 U.S. Standard mesh screen. These granules are then mixed with starch, talc and stearic acid, passed through a #60 U.S. Standard mesh screen and then compressed into tablets.

One tablet is administered twice a day.

Example 5

Ingredients: Mg./capsule, mg.
Polyoxypropylene (M.W. 1200), polyoxyethylene (20%) liquid polymer _____ 250
Sesame oil _____ 50

The oil is dispersed in the polymer and placed in a soft gelatin capsule.

One capsule is administered four times a day.

Example 6

Ingredients: Mg./capsule, mg.
Polyoxypropylene (M.W. 2250), polyoxyethylene (70%) solid polymer _____ 125
Lactose _____ 50

The ingredients are thoroughly mixed and filled into a hard gelatin capsule.

One capsule is administered twice a day.

What is claimed is:

1. The method of producing gastrointestinal spasmolytic activity which comprises administering orally to animals suffering from gastric hypermotility an amount sufficient to produce said activity a polyoxypropylene-polyoxyethylene polymer of the formula:

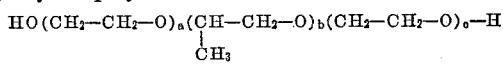

in which the average molecular weight of $b$, the polyoxypropylene units in the mixture, is from about 950 to 2750 and $a$ and $c$, the polyoxyethylene groups, are present from about 5% to about 70% of the molecule.

2. The method of claim 1 wherein the polyoxypropylene units in the polymer have an average molecular weight of from about 950 to about 2750 and the polyoxyethylene units are present from about 10% to about 40% of the molecule and said polymer is administered in a daily dosage regimen of from about 50 mg. to about 4.0 gm.

3. The method of claim 1 wherein the polyoxyethylene units in the polymer have an average molecular weight of from about 2050 to about 2250 and the polyoxyethylene units are present from about 30% to 40% of the molecule and said polymer is administered in a daily dosage regimen of from about 250 mg. to about 1.0 gm.

4. The method of claim 1 wherein a tablet or capsule containing from about 50 mg. to about 1000 mg. of the polymer is administered from 1 to 4 times daily.

5. The method of claim 1 wherein a tablet or capsule containing from about 250 mg. to about 500 mg. of the polymer is administered from 1 to 4 times daily.

References Cited

UNITED STATES PATENTS 2,819,199  1/1958  Kalish _____ 167—66
3,122,478  2/1964  Lafon _____ 167—66
3,202,578  8/1965  Parker _____ 167—56

OTHER REFERENCES

"Pluronics," Wyandotte Chemical, Michigan, 1952, pp. 1–2, 5–7 and 10.

ALBERT T. MEYERS, *Primary Examiner.*

S. FRIEDMAN, *Assistant Examiner.*